United States Patent
Reusing et al.

(10) Patent No.: US 7,698,934 B2
(45) Date of Patent: Apr. 20, 2010

(54) PROCEDURE FOR DIAGNOSIS OF AN EMISSION TREATMENT METHOD AND PROCEDURES TO CARRY OUT SAME SAID METHOD

(75) Inventors: Volker Reusing, Stuttgart (DE); Stefan Stein, Stuttgart (DE); Ralf Scholl, Stuttgart (DE); Guenter Keusen, Stuttgart (DE); Carsten Bork, Tamm (DE)

(73) Assignee: Robert Bosch GmbH, Stuttgart (DE)

( * ) Notice: Subject to any disclaimer, the term of this patent is extended or adjusted under 35 U.S.C. 154(b) by 526 days.

(21) Appl. No.: 11/701,843

(22) Filed: Feb. 2, 2007

(65) Prior Publication Data

US 2008/0319686 A1 Dec. 25, 2008

(30) Foreign Application Priority Data

Feb. 9, 2006 (DE) ...................... 10 2006 005 863

(51) Int. Cl.
*G01M 15/10* (2006.01)
(52) U.S. Cl. .................................................. 73/114.76
(58) Field of Classification Search .............. 73/114.69, 73/114.71, 114.74, 114.75, 114.76
See application file for complete search history.

(56) References Cited

U.S. PATENT DOCUMENTS

2005/0251318 A1* 11/2005 Wickert et al. .............. 701/108
2006/0086084 A1* 4/2006 Gerlach ....................... 60/286
2007/0234709 A1* 10/2007 Bork ............................ 60/282
2008/0264041 A1* 10/2008 Gerlach ....................... 60/286
2009/0044612 A1* 2/2009 Schoenthaler et al. ..... 73/114.71

FOREIGN PATENT DOCUMENTS

| DE | 101 59 849 A1 | 6/2003 |
| DE | 10 2004 018 221 A1 | 11/2005 |
| DE | 10 2004 044 506 A1 | 3/2006 |
| DE | 10 2004 061 247 A1 | 6/2006 |

* cited by examiner

*Primary Examiner*—Eric S McCall
(74) *Attorney, Agent, or Firm*—Merchant & Gould P.C.

(57) ABSTRACT

A procedure specifically for the execution of a diagnosis of an emission treatment system is being introduced. The pressure of the reagent between the first and second valve and/or between the second valve and the injector valve is measured and the pressure measuring signal are the basis of the diagnosis. The first and second valve, are opened in an alternating cycle, where the opening time, and/or the period duration of the first and second valves are set in such a way that the emerging diagnostic flow volume is smaller than the measuring flow volume. The procedures pursuant to the invention thereby reduce the influence of dynamic precursors of the reagent flow in the reagent line and enables, aside from an increase in reliability of the diagnosis results, a diagnosis possibility of small leakages.

13 Claims, 3 Drawing Sheets

PROCEDURE FOR DIAGNOSIS OF AN EMISSION TREATMENT METHOD AND PROCEDURES TO CARRY OUT SAME SAID METHOD

This invention deals with how to ascertain a diagnosis for an emission treatment method and how to execute this method in accordance with the class of the independent requirements.

In DE 10 2004 018 221 A1 the procedure pursuant to the class and method is described, where a pressurized reagent in the emission of an internal combustion engine is injected ahead of an SCR catalyzer. The reagent pressure is set with the nominal value of a proscribed reagent (Soll) pressure. For a nominal value, the operational size of the combustion engine and/or emission nominal value of the combustion engine can be later consulted on. The predetermined and regulated reagent Soll pressure is captured by a reagent Soll pressure sensor, where the actual pressure is then ascertained. Just one defect in a pressure sensor, can lead to a reduced escape of the SCR catalyzer with the result that untreated emission is released into the environment.

DE 10 2004 044 506 A1 described more categorical procedures, where the pressurized reagent is injected into the engine's emission ahead of the SCR catalyzer. The air pressure is discharged via the return valve which in turn will indicate the opening pressure. It is planned to have a diagnosis of the compressed air pressure, which starts at the time of the closing of the compressed air regulator valve. At another point in time, the compressed air pressure is tested to determine if it corresponds to the lower threshold value, which at least, comes close to the added opening pressure of the environmental air pressure of the return valve. An error code will indicate if this condition is not met.

DE 101 59 849 A1 has other pertinent procedures adhering to class and categorical methods listed. This next one describes the method where the pressurized reagent is injected into the engine's emission ahead of the SCR catalyzer; in this case the reagent is fuel, which, as a reducing agent, reacts especially with the NO2 (nitrogen dioxide) part in the emission.

In DE 10 2004 061 247 A1 are pertinent procedures and mechanisms described, where the pressurized reagent is injected into the combustion engine's emission ahead of the emission treatment. In this case, fuel is the reagent which then exothermically reacts on a catalytically reactive surface with the oxygen present in the emission, thereby heating the emission treatment mechanism. The reagent will be set to reach a certain core pressure. Within the flow direction of the reagent, are, for now, a switch able safety valve and a continuous valve. After this, a return valve is arrayed. The pressure of the reagent is captured in the middle reagent path, which runs between the safety valve and the valve. The captured reagent pressure, in its default condition of the safety and/or valve, will at least be compared to a threshold value. If this value is transgressed, an error code is activated. The safety and/or valve are, in regards to the reagent flow within the reagent's path, are set in such a manner that they activate at different times, so that static pressure conditions can be observed. These static pressure conditions changing into dynamic changes are only observable when a transgression of the opening pressure in the return valve occurs or if need be, with the occurrence of an error.

The invention's underlying duty is to indicate a procedure for a diagnosis of an emission treatment system and a system for the execution of the procedure performing with a high degree of reliability.

The above described duty of the invention will be solved by the independent requirement characteristics.

The invention is in accordance with the diagnosis of an emission treatment system, which provides that the pressure of a reagent between the first and second valve and/or between the second and an injector valve is measured; and the pressure signal of the diagnosis is the reason that the first and second valves are alternately opened and closed in a changing cycle, and how the opening and/or period duration is set to at least one of the two valves in such a manner, that the diagnostic flow volume is less than the flow volume.

The invention (in accordance with the procedure) enables in particular the diagnosis of leakages, which for example, happen between the first and second valves and/or between the second valve and the injector valve.

The pertinent invention procedure provides for an accurately measured diagnostic flow volume in the components, so that dynamic predecessors can be avoided, which otherwise could occur during the start of the flow volume and thus will influence the diagnostic results into giving false readings. Dynamic predecessors are, for example, flow dependant pressure losses in components such as lines and valves and especially reagent oscillations within such lines.

According to the inventions procedure, this enables a diagnosis within the pressurized area, which lies between the ambient air pressure and the area of the injector valve's opening pressure. By limiting the diagnostic flow volume to a value below the flow volume, and if the pressure lies in the area of the opening pressure of the injector valve, this can then lead to a comparatively short opening time of the injector valve (which closes rapidly) since the limited diagnostic flow volume is not enough to maintain the flow in the injector valve. This process is favorable for detecting small leaks.

Favorable developments and provisions in accordance with the invention's procedures are contingent upon requirements.

A provision provides that the opening and/or closing period can be set in such a fashion that during a changing cycle maximally occurring pressure changes are smaller than the pressure needed to open the injector valve. The maximum pressure change takes place when the volume has emptied out between, in each case, two valves. The diagnostic flow volume limited reagent flow volume can thus, due to its effects on the pressure changes through the reagent flow volume, be specified. With this, effects on the results of the dynamic flow predecessors are further reduced.

Another provision provides that the opening and/or duration period is set in such a way that a maximum pressure change/time will not be exceeded. By further limiting of the already diagnostic flow volume limited reagent flow volume, possibly occurring dynamic precursors will be further reduced if necessary.

Another provision provides for the first reagent volume between the first and second valve, as long as this volume is smaller than the second reagent volume between the second injector valve provided for second volume. This method ensures that a second area is maintained in which the opening and/or period duration for the precursors of the first and second valve are able to be set so that the diagnostic volume flow will already be limited by the comparatively smaller first volume.

Another provision provides that the pressure signal is compared with a threshold value smaller than the opening pressure of the injector valve. With this setting of the threshold value, leakage will be particularly detectable.

A further provision provides that a comparator compares the captured pressure measuring signal with a threshold value and/or tolerance, whereas the comparison does not take place until after the execution of the delay and/or preset number of cycle changes, so that oscillating precursors at the start of the diagnostic result will not be erroneous.

According to this invention it is pertinent to diagnose an emission treatment system, which envisions an especially built control mechanism for the execution of the procedure. This procedure, pursuant to this invention, is stored within the control mechanisms program procedure.

The control mechanism unit contains a diagnostic control, a threshold value parameter, as well as a comparator, which compares the pressure measuring signal with at least a threshold value.

Another provision provides that the first valve of the emission treatment system is a safety valve and the second one is a valve.

A computer program (pursuant to the invention) provides that all steps of the invented procedure are executed, while being performed on a computer.

Further advantageous developments and systems of these inventions methods will be addressed as required and are described as follows.

DRAWINGS

FIG. 1 depicts an internal combustion engine (10) which has in its intake (11) and intake air capture (12); in the emissions system (13) an injector valve HCIV and up flow after the injector valve HCIV an emission treatment system (14) is arrayed. The emission treatment system (14) contains a catalyzer (15) as well as a particle filter (16).

Figure 1:
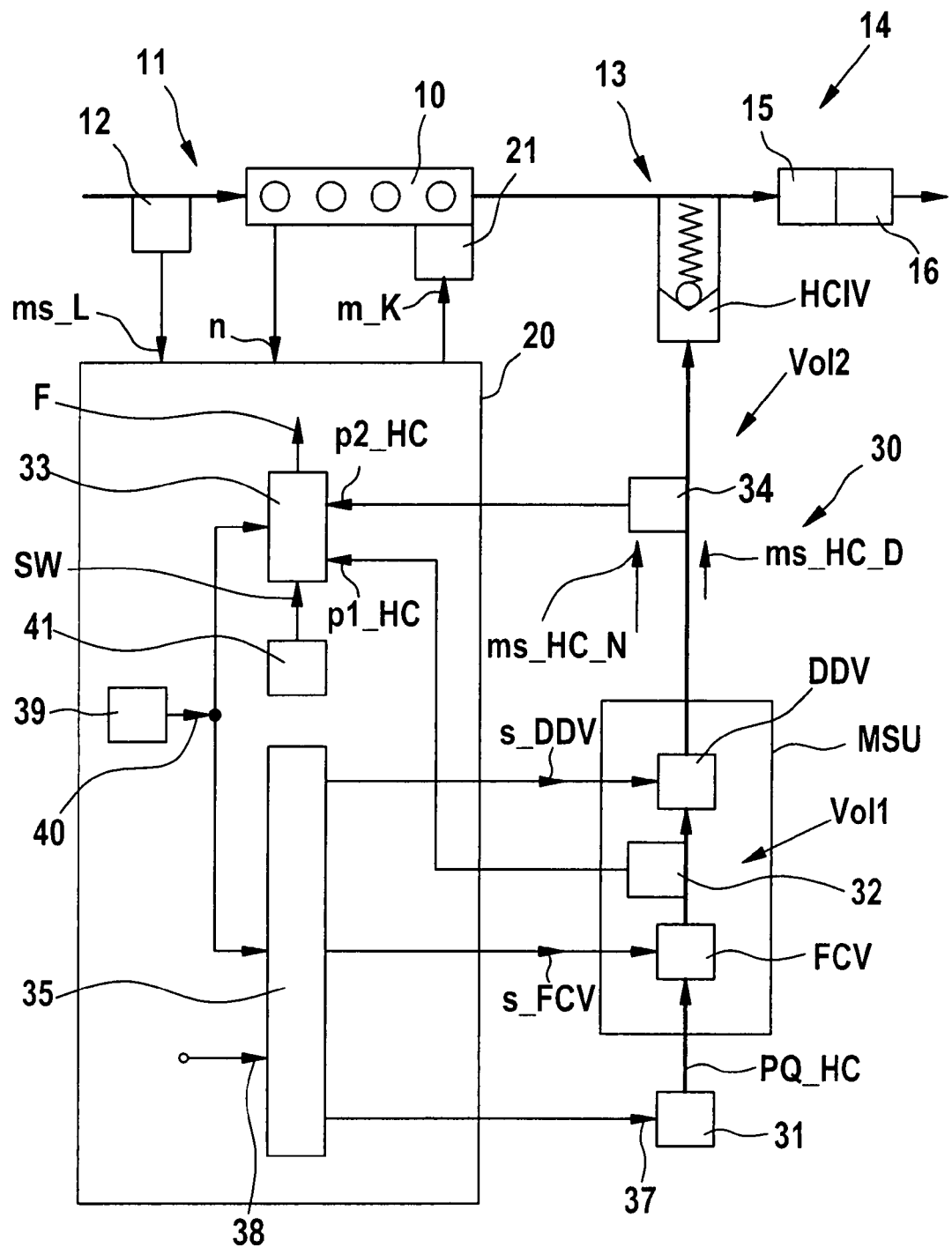
FIG. 1 shows a scientific area in which the invented procedure is being executed.

The intake air capture (12) sends an air signal ms_L to the control system (20) and to the combustion engine (10) an n revolution. The control system (20) provides the fuel supply system (21) with a m_K fuel signal.

In the mid reagent path (30) a pump (31) as well as a safety system MSU are arrayed. The pump and safety system MSU, contain an extra valve FCV as well as a second valve DDV.

Between the first and second valve FCV/DDV, a pressure sensor (32) is located, which measures the reagent pressure between the first and second valves FCV/DDV and measures the first volume Vol1 and serves the first measuring pressure signal p1_HC comparator (33).

Between the second DDV valve and the HCIV injector valve is a second pressure sensor (34), which measures the reagent pressure second Vol2 volume between the second DDV valve and the HCIV injector valve and serves as a second measuring pressure signal p2_HC for the comparator (33).

In both Vol1 and Vol2 volumes, exist a flow volume ms_HC_N and one diagnostic flow volume ms_HC_D. A core pressure PQ_HC occurs downstream after the pump (31).

A reagent control (35) provides the first FCV valve, a first valve control s_FCV and the second DDV valve, a second valve control s_DDV, as well as the pump (31) and a pump control (37). The reagent control (35) is served by a control (38).

The diagnostic control (39) provides the comparator (33) as well as the reagent control (35) a diagnostic signal (40).

The comparator (33) compares the first and/or second measuring pressure signal p1_HC, p2_HC, with a threshold value SW, which is given by a threshold parameter (41).

The comparator (33) in subordination to the comparison result also provides an error code F.

Figure 2A:
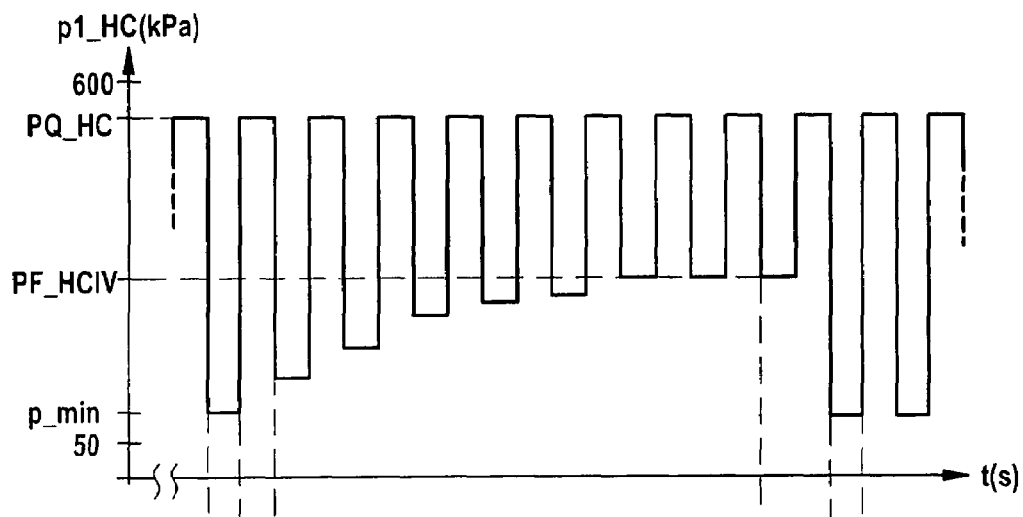
FIG. 2a shows the first pressure control signals in conjunction with its time.

FIG. 2a depicts the first measuring pressure signal p1_HC in subordination to the time factor t, the first measuring pressure signal p1_HC lies between a minimum pressure p_min and the core pressure PQ_HC. The opening pressure PF_HCIV of the HCIV injector valve is registered. The first measuring pressure signal p1_-HC is given as a kPa unit. Registered are the values 50 kPa and 600 kPa. The lower value of the first control valve s_FCV, starts to rise from the minimum pressure p_min, from the $10^{th}$ second to the $18^{th}$ second of the opening pressure PF_HCIV and then falls at the $19^{th}$ second back to the minimum pressure p_min.

Figure 2B:
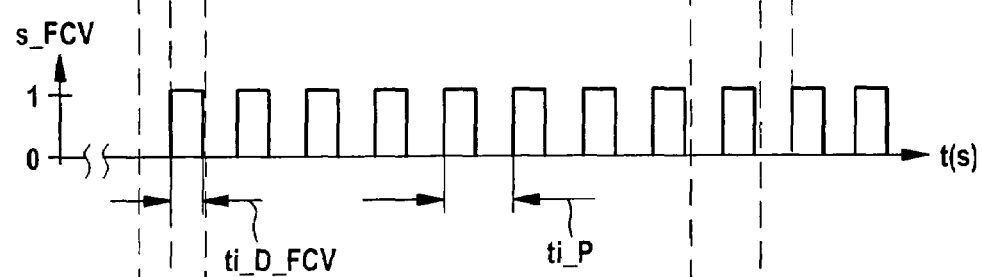
FIGS. 2b and 2c depict a second measuring pressure signal.

FIG. 2b shows the first control valve s_FCV in subordination to the time factor t. The first valve FCV will be opened during the period duration ti_p per each first opening time ti_D_FCV. The period duration ti_P is registered with 1 second.

Figure 2C:
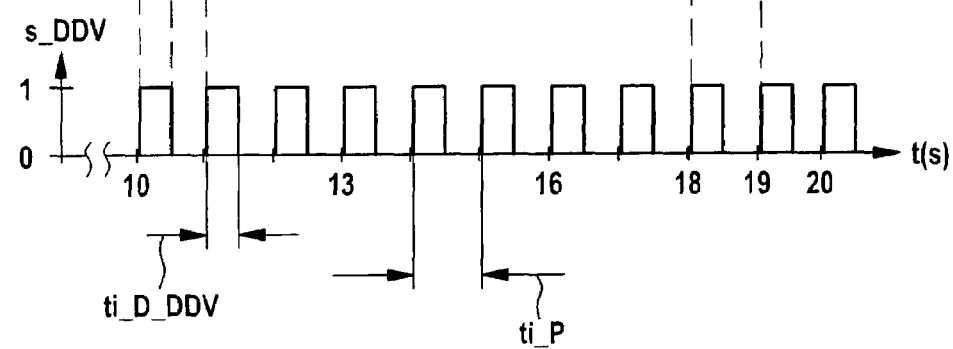

FIG. 2c depicts the second control valve s_DDV in subordination to time factor t, and the second valve DDV will be opened in the period duration ti_P, per each second opening time ti_D_DDV.

Figure 3A:
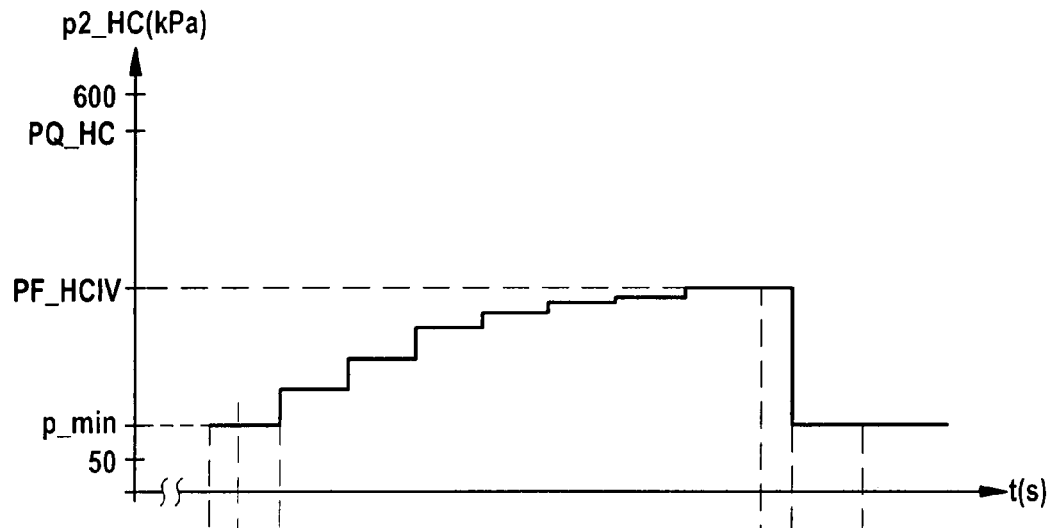
FIG. 3a shows the second pressure control signals in conjunction with its time.

FIG. 3a shows the second measuring pressure signal p2_HC in subordination to the time. The second measuring pressure signal p2_HC lies between the minimum pressure p_min and the opening pressure PF_HCIV of the injector valve HCIV. Additionally registered is the core pressure PQ_HC. The second measuring pressure signal p2_HC is also shown in a kPa unit. Its registered values are 50 kPa and 600 kPa. The lower value of the second control valve p2_HC starts to rise from the minimum pressure p_min, from the $10^{th}$ second to the $18^{th}$ second of the opening pressure PF_HCIV and then falls at the $18.5^{th}$ second back to the minimum pressure p_min.

Figure 3B:
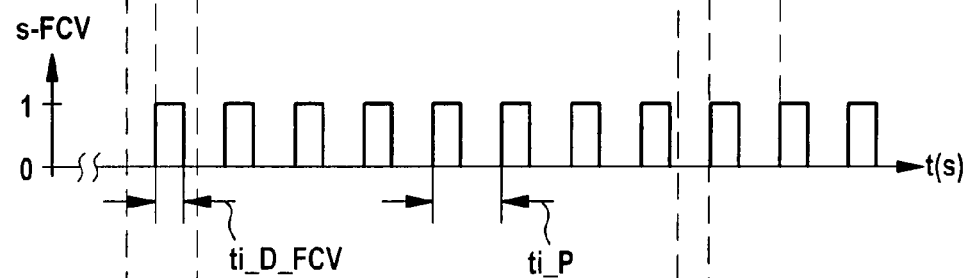
FIGS. 3b and 3c again show the previously shown valve control signals as in 2b and 2c.
Figure 3C:
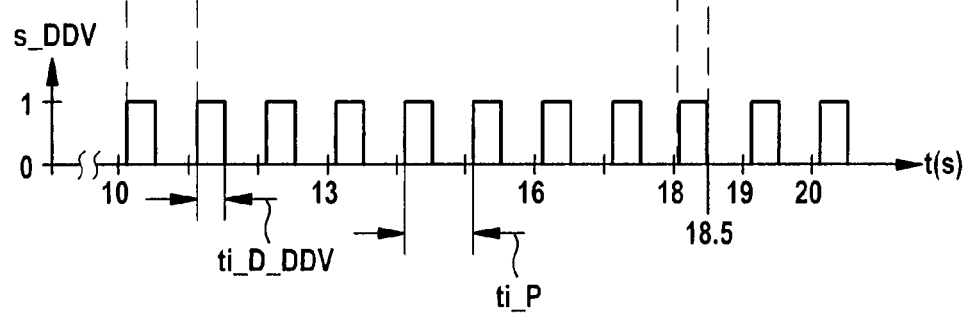

FIGS. 3b and 3c are the same as FIGS. 2b and 2c.

The procedure pursuant to the invention works as follows:

The control mechanism (20) is to set the fuel signal m_K (for example) in subordination to the air signal ms_L and/or in subordination to the revolution n and/or in subordination of a preset torque nominal speed, which is provided by the combustion engine (10). The fuel signal m_K is to set the duration of the fuel injection into the fuel supply mechanism (21).

A combustion engine's (10) emission contains such undesirable items such as nitrous oxide and/or particles. This can be prevented with the emission treatment system (14).

The emission treatment system (14) may contain a catalyzer (14). This can be an oxidations catalyzer, a storage catalyzer, or a nitrous oxide storage catalyzer, or a 3-way catalyzer or an SCR catalyzer. Additionally, the emissions treatment system (14) may have a particle filter (16) installed as well.

The emission treatment system (14) could require a minimum temperature, which must be able to be over ridden in order to enable the cleaning function of the emissions or to execute regeneration. For instance, within a particular temperature window, a reaction of a catalytic reactive surface is optimally executed. Furthermore, the minimum temperature can be required in order to execute regeneration of a storage catalyzer and/or particle filter. To start the particle filter's burn off of its particles may require a starting temperature, in conjunction with the conditioning of the particles, between 450° C. to 650° C. A storage catalyzer requires for regeneration of a sulfuric poisoning a high temperature of up to 800° C.

To increase the emissions temperature, a reagent is inserted into the emission system (13) which then reacts exothermically on a catalytic reactive surface. The reagent could be further required in a catalyzer (15). For instance, the nitrous oxide storage catalyzer requires an oxygen poor emission to execute its regeneration.

The injector valve HCIV is located upstream ahead of the emission treatment system (14) and introduces the reagent into the emission area (13). The injector valve HCIV is preferably used here as a return valve. In each case, the injector valve HCIV gives an opening pressure PF_HCIV, which is especially realizable if used as a return valve and can then be set with a definite value.

The reagent for the vehicle is fuel, so that separate taking along of another reagent is not necessary. Based on the easy ignition ability of fuel and especially with fuel exhaust, more stringent safety requirements are to be assured.

The reagent is taken from the pump (31) with the default core pressure PQ_HC, which for instance is set at 600 kPa. The separately shown pump (31) is not needed if fuel is used as the reagent. In this case, the fuel can be drawn from the combustion engine's (10) lower pressure fuel circuit. This type of combustion engine (10) will have a fuel pump arrayed to the fuel tank.

The reagent line/path (30) contains the first valve FCV, which is configured as a safety valve, and is either fully opened or closed by the valve control s_FCV preferentially.

The flow through rate for the reagent can be adjusted by the downstream arrayed second valve DDV, which functions as a valve. It is preferred that the second valve DDV is set to continuous operation, with a pulse controlled operation with which the second valve DDV is opened and closed faster by the second valve control s_DDV.

Due to the emission area's (13) possible higher temperatures, it can become necessary that the first and second valve FCV, DDV are installed apart from the emission system (13), and to insert the reagent with the injector valve HCIV. This can be achieved in a cost effective manner with high temperature stability. In the depicted execution example, the first valve FCV and the second valve DDV are arrayed in the safety mechanism MSU.

Between the first valve FCV and the second valve DDV, the first volume Vol1 is present for the reagent, to which the pressure sensor (32) is arrayed, which gives the first measuring pressure signal p1_HC.

Between the second valve DDV and the injector valve HCIV, the second volume Vol2, is present to serve the reagent, on which the second pressure sensor (34) is arrayed, which gives the second measuring pressure signal p2_HC. According to the invention's procedures, the evaluation can be based on the first measuring pressure signal p1_HC and/or the second measuring pressure signal p2_HC.

With the diagnostic treatment, leakages in the first volume Vol1 and/or second volume Vol2, can be easily detected. The diagnostic treatment is in principle—as taken from the state of technology—executed statically, where both valves FCV, DDV or at least one of these valves FCV, DDV are either opened or closed statically. What statically means is that the dynamic predecessors during the reagent flow are not considered, thus it is assumed that the dynamic predecessors have no influence on the result of the diagnosis. But, when conducting experiments, it has been shown that dynamic predecessors in reagent flow/path (30) do have an effect on the results of the diagnosis.

Thus, pursuant to the invention, it is planned to open the first and second valve, FCV, DDV during diagnostics, in an alternating cycle.

During normal operations, the reagent control (35) with a present signal (38) and the first and second valve controls s_FCV and s_DDV, sets the first FCV valve to completely open and the second valve DDV in conjunction with the preset measured amount, to a particular opening section; a predetermined timed frequency. With this the volume ms_HC_N is set.

The control (39) starts the diagnostics with a diagnosis signal (40), which also activates the comparator (30), as well as the reagent control (35) for the delivery of the reagent in FIGS. 2b, 2c, and 3b and 3c depicted valve control signals s_FCV and s_DDV. The goal of this procedure is to reduce the reagent flow volume opposite of the reagent flow volume ms_HC_N occurring diagnostic flow volume ms_HC_D. With this measure, the effects of the dynamic predecessors on the diagnostic results are effectively reduced.

The reduced diagnostic flow volume ms_HC_D causes dynamic pressure losses in single components in the reagent middle/median pathway (30) which must be avoided, so that the first and/or second measuring pressure signal p1_HC, p2_HC in either the first and/or second volumes Vol1, Vol2, dominantly quasi stationary reagent pressure can be ascertained. With the start of the diagnostic flow volume ms_HC_D, in particular, an oscillation of the reagent especially in the second volume Vol2 is suppressed, which can be observed in particular, if the injector valve HCIV is used a return valve with a precise outfitted preset opening pressure PF_HCIV.

With the start of the reduced diagnostic flow volume ms_HC_N opposite the flow volume ms_HC_D, it is possible to pump the second volume Vol2 slower, until the reagent median pressure PF_HCIV reaches the injector valve HCIV or the reagent median pressure in the area of the opening pressure PF-HCIV remains. The injector valve HCIV will open when it reaches the opening pressure PF_HCIV, but because of the limited diagnostic flow volume ms_HC_D only a small amount of the reagent amount will flow through until the injector valve HCIV again closes.

With the procedure according to the invention, it is possible to hold the reagent pressure in the second volume Vol2 precisely within the area of the opening pressure PF-HCIV of the injector valve HCIV, without an appreciable measurement of the reagent taking place. Due to this, and evaluation of the first and/or second measuring pressure signals p1_HC, p2_HC can take place in the comparator (33) a reliable diagnosis in respect to leakage in the first and/or second Vol1, Vol2 can be performed.

FIG. 2a shows a possible timely execution of the first reagent signal p1_HC. In the $10^{th}$ second the second volume Vol2 is to be emptied. With the opening of the first valve FCV for the opening time ti_D_FCV, the second valve DDV is closed simultaneously, and the first volume Vol1 is filled. In this condition, the pressure sensor (32) captures the core pressure PQ_HC. Next, the first valve FCV is closed and the second valve DDV is opened. In subordination to the second opening time ti_D_DDV, a part of the first volume Vol1 retained reagent flows into the second volume Vol2 or a complete adjustment with a longer second opening time ti_D_DDV takes place. Correspondingly, the first pressure signal p1_HC will show a pressure increase.

On one side dependant on the volume relationships and on the other side on the length of the cycle of the first and second valves FCV, DDV, such as the opening time ti_D_DDV, it can already be seen in the first cycle that the pressure does increase in the opening pressure PF_HCIV. Limitation of the diagnostic flow volume ms_HC_D is essential to a lower value versus the measuring flow volume ms_HC_N.

Alternatively, as per the shown example, where the diagnosis is started by the minimum pressure p_min, the diagnosis can be started with any pressure. If the pressure is above the opening pressure PF_HCIV, then through the opening of the injector valve, the reagent pressure can be reduced all the way to the area of the opening pressure PF_HCIV.

The example shown in FIG. 2a, rests on the fact that the pressure measuring signal p1_HC continues to increase to the 17 or $18^{th}$ second of the opening pressure PF_HCIV. If the reagent pressure lies in the area of the opening pressure PF_HCIV, then the injector valve will open quickly so that the reagent pressure stabilizes in the area of the opening pressure PF_HCIV, as long as there is no leakage in the first and/or second volume Vol1, Vol2. If this is the case, then a pressure decline will occur.

In the depicted example it is thought that in the area between the 18 and $19^{th}$ second, a leakage of the second volume Vol2 has occurred, and furthermore it is assumed that this leakage will cause a complete pressure decline all the way to the minimum pressure p_min, where the minimum pressure p_min corresponds in general to the ambient air pressure. The pressure decline can only be captured by the first pressure sensor (32) when the second valve DDV opens. If the leakage occurs in the first volume Vol1, then the pressure sensor (32) immediately detects the decline. Due to the limited provided reagent within the change cycles of volumes Vol1/Vol2, it is possible, based on the invention's procedure, to detect comparatively small leakages. In particular the first pressure measuring signal p1_HC will then not be corrupted by disruptive signals due to the oscillations of the reagent within the reagent line (30).

As per an arrangement, it is planned for the first volume Vol1 to be smaller than the second volume Vol2. With this, the opening time ti_D_FCV and/or the second opening time ti_D_DDV, of the first and or second valves FCV, DDV, has more playing room. Especially the second opening time ti_D_ DDV of the second valve DDV can thus be set in such a way that a complete balancing of the reagent in both volumes Vol1, Vol2 can take place. With this method, the dynamic precursors can be influenced via a targeted margin of both volumes Vol1, Vol2.

Based on another arrangement, it is considered that the first and/or second opening time ti_D_FCV, ti_D_DDV of the first and/or second valves FCV, DDV, are set to just one value, with which the pressure increase/time is limited to a maximum value. This maximum value can occur when the second volume Vol2 is completely emptied at the beginning of the diagnosis. Limiting the pressure gradient to a maximum value also contributes to the reduction in the effects of the dynamic precursors on the diagnostic result.

Of the depicted FIGS. 2b and 2c valve control signals s_FCV, s_DDV, it can be deduced that the opening times ti_D_FCV and ti_D_DDV of the two valves FCV, DDV do not overlap. In the shown example it is supposed that the change cycle takes place within the period duration ti_P, which (as in the depicted example) lasts for 1 second. In a preferred design example, the period duration ti_P is locked to a high value of at most 1 second and can be lowered to 20 milliseconds. Correspondingly the opening times ti_D_FCV and ti_D_DDV are to be adjusted to this. In the shown design the opening times ti_D_FCV and ti_D_DDV are planned to be of at most 0.5 seconds in duration, with the lowest setting of 10 milliseconds.

FIG. 3a shows a synchronized schedule of the second pressure measuring signal p2_HC which is based on the same start as seen in FIG. 2a. Even with this example it is presumed that the diagnosis begins with an emptied out second volume Vol2, with a minimum pressure p_min, based on the separation of the first volume Vol1 from the second volume Vol2 during the filling of the first volume Vol1, the second pressure sensor (34) will no longer capture the core pressure PQ_HC. Instead, with each opening of the second valve DDV, the reagent increases incrementally to the opening pressure PF_HCV, which is to be reached at the $18^{th}$ second. As previously stated, the diagnosis can be started with any pressure.

In the depicted example, it is presumed that in the 18.5 second, a leakage occurred, which further contends that this leakage is so great that it led to a reduction in pressure all the way to the minimum pressure p_min. Such a reduction in pressure can be detected by the second pressure sensor (34) at any time, as long as the leakage occurs in the second volume Vol2. Should the leakage happen in the first volume Vol1, then the second pressure sensor (34) can only detect the leakage at the time of the opening of the second valve DDV.

The comparator (33) compares the first and/or second pressure measuring signal p1_HC, p2_HC with the threshold value SW, which is set by the threshold value design (41). In place of a single value, the threshold value design (41) has a tolerance. The threshold value design is set to one value one area, which lies below the opening pressure PF_HCIV of the injector valve HCIV.

What must be considered are the eventually planned fillings of the second volume Vol2, based on the emptied out conditions, as has been shown in the examples and/or simultaneous short openings of the first and second valves FCV, DDV. The second comparator (33) now may only do its comparison after a proscribed delay or after a set amount of change cycles, in order to avoid a misdiagnosis. In the shown example, the comparator may only compare the first and/or second pressure measuring signal p1_HC, p2_HC, starting at the $17^{th}$ second, with the threshold value SW. Depending on the volume relationships, the above described short opening time of the first and second valves, FCV, DDV, the time until the first comparison with the threshold value SW, are clearly shortened. If a lowering of the threshold value SW or of the tolerance is detected, the comparator (33) will give the error code F, which for instance can be stored in an error log or set to indicate the error.

The invention claimed is:

1. A method of diagnosing an emissions treatment system, the method comprising:
    measuring a pressure of a reagent between a first and a second valve and/or between the second valve and an injector valve; and
    based on the pressure, opening and closing the first and second valves in an alternating cycle, wherein the opening times of the first and second valves and/or a period of duration of being opened are set such that an emerging diagnosis flow volume is smaller than a measured flow volume.

2. A method according to claim 1, wherein the opening time and/or the period of duration are set where during the alternating cycle an occurring pressure change is smaller than an opening pressure of the injector valve.

3. A method according to claim 1, wherein the opening time and/or the period of duration are set to not over-ride a maximum pressure change/time.

4. A method according to claim 1, wherein a reagent provided first volume between the first and second valves is smaller for a reagent provided second volume, between the second valve and the injector valve.

5. A method according to claim 1, wherein the pressure measured is compared with a threshold value, which is smaller than an opening pressure of the injector valve.

6. A method according to claim 1, wherein the opening times of the first and/or second valve is between 0.01 and 0.5 seconds.

7. A method according to claim 1, wherein the pressure measured is compared with a threshold value after a set waiting period or a preset amount of alternating cycles.

8. A device that diagnoses an emission treatment system, the device comprising a control mechanism that measures a pressure of a reagent between a first and a second valve and/or between the second valve and a, injector valve, and based on the pressure opens and closes the first and second valves in an alternating cycle, wherein opening times of the first and second valves and/or a period of duration of being opened are set such that an emerging diagnosis flow volume is smaller than a measured flow volume.

9. A device according to claim 8, wherein the control mechanism contains a diagnostic control, a threshold value design and a comparator.

10. A device according to claim 8, wherein the first valve of the emission treatment system is also a safety valve and the second valve is a measuring valve.

11. A device according to claim 8, wherein the first valve of the emission treatment system is the measuring valve and the second valve is the safety valve.

12. A device according to claim 8, wherein the injector valve of the emission treatment system is a return valve with a preset opening pressure.

13. A computer program product with a machine readable medium stored program code for the execution of instructions for diagnosing an emissions treatment system the computer program product having instructions for measuring a pressure of a reagent between a first and a second valve and/or between the second valve and an injector valve; and based on the pressure, opening and closing the first and second valves in an alternating cycle, wherein opening times of the first and second valves and/or a period of duration of being opened are set such that an emerging diagnosis flow volume is smaller than a measured flow volume.

* * * * *